(12) United States Patent
Chen

(10) Patent No.: US 9,678,238 B2
(45) Date of Patent: Jun. 13, 2017

(54) INTELLIGENT TRAIN WHEEL SENSOR

(71) Applicant: Chengdu Senchuan Technical Co., Ltd., Chengdu, Sichuan Province (CN)

(72) Inventor: Lu Chen, Chengdu (CN)

(73) Assignee: Chengdu Senchuan Technical Co., Ltd., Chengdu (CN)

( * ) Notice: Subject to any disclaimer, the term of this patent is extended or adjusted under 35 U.S.C. 154(b) by 9 days.

(21) Appl. No.: 14/513,825

(22) Filed: Oct. 14, 2014

(65) Prior Publication Data

US 2015/0102805 A1 Apr. 16, 2015

(30) Foreign Application Priority Data

Oct. 11, 2013 (CN) .......................... 2013 1 0473078

(51) Int. Cl.
| | |
|---|---|
| *G01V 3/10* | (2006.01) |
| *H02J 7/02* | (2016.01) |
| *H02J 50/10* | (2016.01) |
| *H02J 7/00* | (2006.01) |

(52) U.S. Cl.
CPC ................ *G01V 3/10* (2013.01); *H02J 7/025* (2013.01); *H02J 50/10* (2016.02); *H02J 7/0052* (2013.01); *H02J 2007/0095* (2013.01)

(58) Field of Classification Search
CPC ........... G01V 3/10; H02J 7/0052; H03M 1/12
See application file for complete search history.

(56) References Cited

U.S. PATENT DOCUMENTS

| | | | | |
|---|---|---|---|---|
| 6,371,417 B1* | 4/2002 | Southon | .................. | B61L 1/165 246/247 |
| 6,511,023 B2* | 1/2003 | Harland | ................ | B61L 25/021 246/122 R |
| 6,663,053 B1* | 12/2003 | Shams | .................... | B61L 5/107 246/122 R |
| 7,161,473 B2* | 1/2007 | Hoshal | ................... | G01D 9/005 340/436 |
| 7,213,789 B1* | 5/2007 | Matzan | .................... | B61K 9/12 246/169 R |
| 7,471,016 B2* | 12/2008 | Stoicescu | ............ | H01M 10/425 307/150 |

(Continued)

*Primary Examiner* — Huy Q Phan
*Assistant Examiner* — Alvaro Fortich
(74) *Attorney, Agent, or Firm* — Verrill Dana, LLP

(57) ABSTRACT

This disclosure relates to an intelligent train wheel sensor including a permanent magnetic coil and a low-pass filter circuit, an amplifying and shaping circuit, an analog/digital conversion circuit, and an output interface and interface conversion circuit, which are connected to each other in turn. The analog/digital conversion circuit and the output interface and interface conversion circuit being connected to a micro-processing control unit. The permanent magnetic coil is further connected in turn to a rectifier and filter circuit, a power storage circuit, a charging control circuit and rechargeable batteries. The rechargeable batteries supply power to the low-pass filter circuit, the amplifying and shaping circuit, the analog/digital conversion circuit, the micro-processing control unit and the output interface and interface conversion circuit. Such intelligent sensor has high reliability, requires no external power supply, can be installed and maintained conveniently. Furthermore, such intelligent sensor can identify a wheel signal of a low-speed train.

4 Claims, 2 Drawing Sheets

(56) References Cited

U.S. PATENT DOCUMENTS

| | | | | |
|---|---|---|---|---|
| 7,481,400 | B2* | 1/2009 | Appleby | B61L 1/06 246/122 R |
| 8,030,871 | B1* | 10/2011 | Young | A63H 19/24 246/187 R |
| 2006/0076461 | A1* | 4/2006 | DeRose | B61K 9/00 246/122 R |
| 2011/0115284 | A1* | 5/2011 | Head | B60T 8/1705 303/132 |
| 2011/0127389 | A1* | 6/2011 | Bartek | B61L 1/02 246/124 |
| 2013/0241464 | A1* | 9/2013 | Kim | H02J 7/00 320/101 |

* cited by examiner

INTELLIGENT TRAIN WHEEL SENSOR

RELATED APPLICATIONS

Under 35 USC 119, this application claims the benefit of the Oct. 11, 2013 priority date of Chinese application CN 201310473078.0, the content of which is herein incorporated by reference in its entirety.

TECHNICAL FIELD

The present disclosure relates to a train wheel sensor, particularly to the field of train wheel sensors having a low-speed (<5 km/h) processing function.

BACKGROUND

Train wheel sensors are sensors installed on the inside of rails to detect whether or not train wheels pass by. At present, train wheel sensors are mainly classified into passive train wheel sensors and active train wheel sensors.

The working principle of a passive train wheel sensor is as follows: when train wheels pass by, the wheels cut the permanent magnetic field of the wheel sensor, so that a corresponding alternating signal is induced in the sensor coil, and a signal indicating that train wheels have passed by is provided. The passive train wheel sensors have the following major advantages that no external power supply is required when in use and few components are applied. However, the passive train wheel sensors have the following disadvantages that the magnitude of an output signal will vary along with the speed of a train. Particularly, the output signal is likely to be interfered when the speed of a train is lower than 5 km/h. As a result, the complexity of rear-end processing circuits is increased.

The working principle of an active train wheel sensor is as follows: a wheel signal is converted, by an active magnetic sensor inside the sensor, into a high level (there are wheels passed by) or low level (there are no wheels passed by) signal having a fixed magnitude. Generally, a wheel signal of a low-speed train can be identified. The active train wheel sensors have the following advantage that the output signal has a fixed magnitude. However, the active train wheel sensors need an external power supply to work, and are inconvenient in installation and maintenance; meanwhile, in harsh trackside environment, the power supply is likely to be damaged. As a result, the sensor has low reliability and relatively short mean time between failures.

SUMMARY

An object of the present disclosure is to provide an intelligent train wheel sensor, which requires no external power supply, can be installed and maintained conveniently, and has high reliability, and which can identify a wheel signal of a low-speed (<5 km/h) train.

To achieve the above object, the present disclosure employs the following technical solutions:

An intelligent train wheel sensor is provided, consisting of:

a permanent magnetic coil and a low-pass filter circuit, an amplifying and shaping circuit, an analog/digital conversion circuit, and an output interface and interface conversion circuit, which are connected to each other in turn, both the analog/digital conversion circuit and the output interface and interface conversion circuit being connected to a micro-processing control unit; and
the permanent magnetic coil being further connected in turn to a rectifier and filter circuit, a power storage circuit, a charging control circuit and rechargeable batteries, and, the rechargeable batteries supplying power to the low-pass filter circuit, the amplifying and shaping circuit, the analog/digital conversion circuit, the micro-processing control unit, and the output interface and interface conversion circuit.

Working Process and Principle of the Present Disclosure

When wheels passed by a sensor, the permanent magnetic coil generates an alternating induced current. The alternating induced current charges the power storage circuit after passing through the rectifier and filter circuit. Under the control of the charging control circuit, the power storage circuit charges the rechargeable batteries. Then, the rechargeable batteries supply power to the low-pass filter circuit, the amplifying and shaping circuit, the analog/digital conversion circuit, the micro-processing control unit, and the output interface and interface conversion circuit.

Meanwhile, the permanent magnetic coil generates an induced voltage when wheels passed by the sensor. The induced voltage is filtered by the low-pass filter circuit to remove interference, and then amplified and shaped by the amplifying and shaping circuit. Under the control of the micro-processing control unit, the analog/digital conversion circuit converts the amplified and shaped signal into a numerical signal. The numerical signal is converted, by the output interface and interface conversion circuit, into a standard Transistor-Transistor logic ("TTL") digital signal or positive/negative square signal, and then transmitted to a rear-end processing apparatus for use.

Compared with the prior art, the present disclosure has the following advantages.

1. In the present disclosure, as the rechargeable batteries are charged after the induced current of the permanent magnetic coil is rectified, filtered and then power stored, the problem on the power supply of the sensor is solved skillfully without any external power supply; and the sensor as provided by the present disclosure may be installed and maintained conveniently, and has high reliability.
2. As the sensor can be powered by itself, by the continuous processing by using the low-pass filter circuit, the amplifying and shaping circuit, the analog/digital conversion circuit controlled by the micro-processing control unit and the output interface and interface conversion circuit, a standard TTL digital signal or positive/negative square signal may be provided for the rear-end processing apparatus, so that the problem that a passive sensor is difficult to identify a wheel signal of a low-speed (<5 km/h) train is overcome.
3. Under the control of the micro-processing control unit, the sensor has two output modes: the first one is outputting a TTL digital signal, and the second one is outputting a positive/negative square signal. The sensor may be applied to different requirements and has a broad scope of applications.

The foregoing output interface and interface conversion circuit is connected to a wireless transmission unit.

In this way, a detection signal of the sensor is transmitted to a rear-end processing apparatus in a wireless transmission way. There is no power line or signal line between the sensor and the rear-end processing apparatus. Therefore, wiring on the trackside is omitted, so the cost of installation and maintenance is further reduced. More important, accidents, resulted from failed wheel detection due to the damage to the trackside wiring, are avoided completely, and the reliability of the sensor and the running safety of trains are improved effectively.

The foregoing wireless transmission unit is further connected to a radio frequency lightning protection unit.

In this way, when a signal is transmitted to the rear-end processing apparatus in a wireless transmission way in the present disclosure, the sensor may be protected from lightning stroke and high-voltage induced electricity, so that the reliability of the sensor is further improved.

The foregoing output interface and interface conversion circuit is further connected to a lightning protection unit.

In this way, when a signal is transmitted to the rear-end processing apparatus in a wired transmission way in the present disclosure, the sensor may also be protected from lightning stroke and high-voltage induced electricity, so that the reliability of the sensor is further improved.

The present disclosure will be further described as below in details with reference to accompanying drawings by specific embodiments.

SPECIFIC EMBODIMENTS

Embodiment 1

Figure 1:
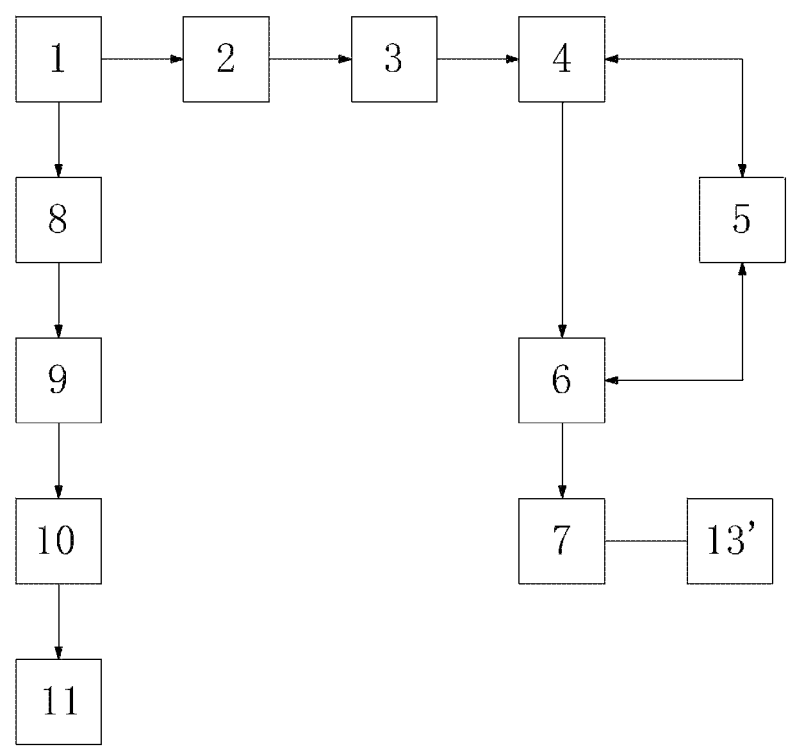
FIG. 1 is a diagram of principle of a circuit according to Embodiment 1 of the present disclosure.

As shown in FIG. 1, as a specific embodiment of the present disclosure, an intelligent train wheel sensor is provided, consisting of:

a permanent magnetic coil 1 and a low-pass filter circuit 2, an amplifying and shaping circuit 3, an analog/digital conversion circuit 4, and an output interface and interface conversion circuit 6, which are connected to each other in turn, both the analog/digital conversion circuit 4 and the output interface and interface conversion circuit 6 being connected to a micro-processing control unit 5; and the permanent magnetic coil 1 being further connected in turn to a rectifier and filter circuit 8, a power storage circuit 9, a charging control circuit 10 and rechargeable batteries 11, and, the rechargeable batteries 11 supplying power to the low-pass filter circuit 2, the amplifying and shaping circuit 3, the analog/digital conversion circuit 4, the micro-processing control unit 5 and the output interface and interface conversion circuit 6.

The output interface and interface conversion circuit 6 in this embodiment is further connected to a wireless transmission unit 7.

The wireless transmission unit 7 in this embodiment is further connected to a radio frequency lightning protection unit 13'.

The rechargeable batteries 11 in this embodiment further supply power to the wireless transmission unit 7 and the radio frequency lightning protection unit 13'.

In this embodiment, a detection signal is transmitted by the wireless transmission unit 7 to a rear-end processing apparatus in a wireless transmission way; and, an output signal may be a standard TTL digital signal or a positive/negative square signal.

Embodiment 2

Figure 2:
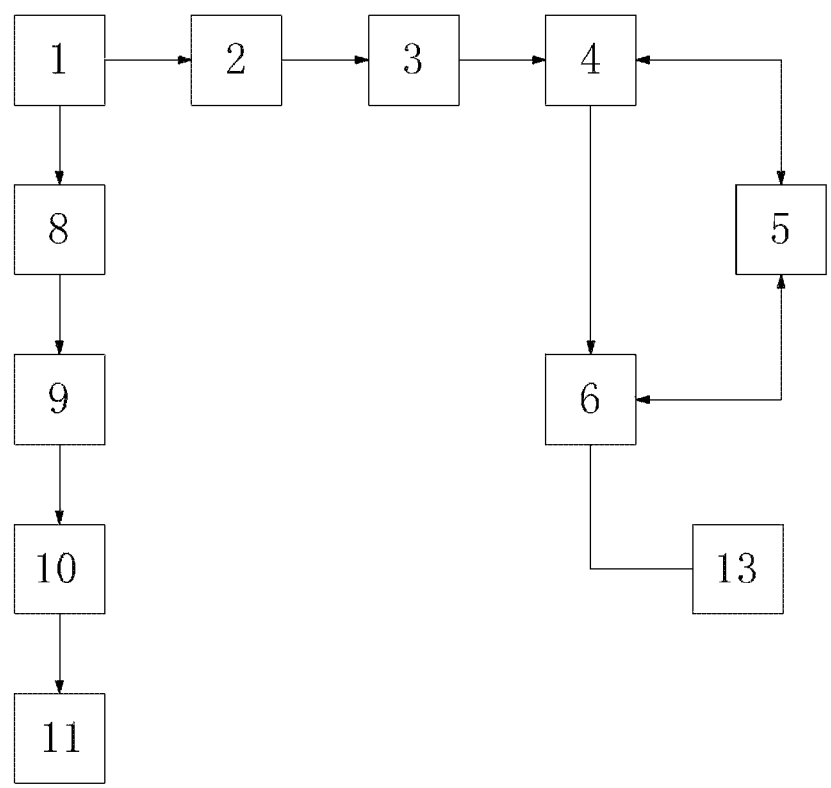
FIG. 2 is a diagram of principle of a circuit according to Embodiment 2 of the present disclosure.

As shown in FIG. 2, as another specific embodiment of the present disclosure, an intelligent train wheel sensor is provided, consisting of:

a permanent magnetic coil 1 and a low-pass filter circuit 2, an amplifying and shaping circuit 3, an analog/digital conversion circuit 4, and an output interface and interface conversion circuit 6, which are connected to each other in turn, both the analog/digital conversion circuit 4 and the output interface and interface conversion circuit 6 being connected to a micro-processing control unit 5; and the permanent magnetic coil 1 being further connected in turn to a rectifier and filter circuit 8, a power storage circuit 9, a charging control circuit 10 and rechargeable batteries 11, and, the rechargeable batteries 11 supplying power to the low-pass filter circuit 2, the amplifying and shaping circuit 3, the analog/digital conversion circuit 4, the micro-processing control unit 5 and the output interface and interface conversion circuit 6.

The output interface and interface conversion circuit 6 in this embodiment is further connected to a lightning protection unit 13.

In this embodiment, a detection signal is transmitted to a rear-end processing apparatus in a wired transmission way; and, an output signal may be a standard TTL digital signal or a positive/negative square signal.

What is claimed is:

1. A train wheel sensor to detect train wheels as they pass the sensor, the sensor comprising:
   a permanent magnetic coil and a low-pass filter circuit, an amplifying and shaping circuit, an analog/digital conversion circuit, and an output interface and interface conversion circuit, which are directly connected to each other in turn, both the analog/digital conversion circuit and the output interface and interface conversion circuit being connected to a micro-processing control unit; and
   the permanent magnetic coil being further directly connected in turn to a rectifier and filter circuit, a power storage circuit, a charging control circuit, and rechargeable batteries,
   when the train wheels pass the train wheel sensor, the permanent magnetic coil generates an alternating induced current and an induced voltage; wherein the alternating induced current charges the power storage circuit after passing through the rectifier and filter circuit, under the control of the charging control circuit, the power storage circuit charges the rechargeable batteries, then the rechargeable batteries supply power to the low-pass filter circuit, the amplifying and shaping circuit, the analog/digital conversion circuit, the micro-processing control unit, and the output interface and interface conversion circuit;
   wherein the induced voltage is filtered by the low-pass filter circuit to remove interference, and then amplified and shaped by the amplifying and shaping circuit, under the control of the micro-processing control unit, the analog/digital conversion circuit converts the amplified and shaped signal into a numerical signal, the numerical signal is converted, by the output interface and interface conversion circuit, into a standard Transistor-Transistor Logic (TTL) digital signal or positive/negative square signal, and then transmitted to a rear-end processing apparatus for use.

2. The train wheel sensor according to claim 1, wherein the output interface and interface conversion circuit is further connected to a wireless transmission unit.

3. The train wheel sensor according to claim 2, wherein the wireless transmission unit is further connected to a radio frequency lightning protection unit.

4. The train wheel sensor according to claim 1, wherein the output interface and interface conversion circuit is connected to a lightning protection unit.

\* \* \* \* \*